W. RUTHERFORD.
DETACHABLE TIP FOR BILLIARD CUES.
APPLICATION FILED MAY 7, 1914.
1,123,807.
Patented Jan. 5, 1915.
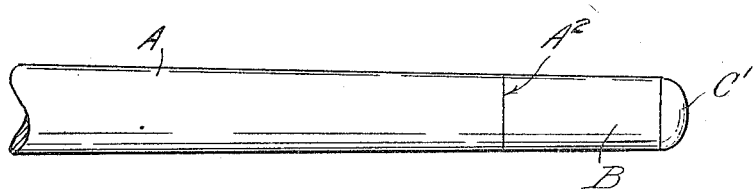
Fig. 1
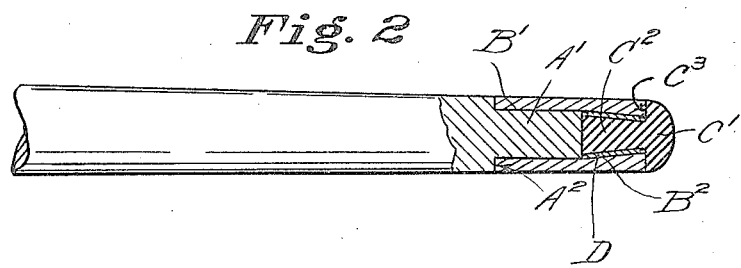
Fig. 2
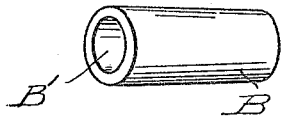
Fig. 3
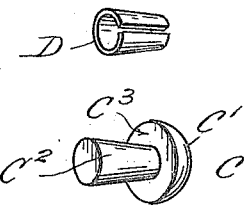
Fig. 4
Fig. 5
WITNESSES:
Clarence O. Cook
E. Peterson
INVENTOR:
William Rutherford
BY
Pierre Barnes
ATTORNEY

UNITED STATES PATENT OFFICE.

WILLIAM RUTHERFORD, OF SEATTLE, WASHINGTON.

DETACHABLE TIP FOR BILLIARD-CUES.

1,123,807.

Specification of Letters Patent.

Patented Jan. 5, 1915.

Application filed May 7, 1914. Serial No. 836,894.

*To all whom it may concern:*

Be it known that I, WILLIAM RUTHERFORD, a subject of the King of England, residing at Seattle, in the county of King and State of Washington, have invented certain new and useful Improvements in Detachable Tips for Billiard-Cues, of which the following is a specification.

The object of this invention is to provide means for fastening a billiard-cue tip in place, so as to be conveniently connected to or detached from the cue stock.

The invention consists, essentially, in a ferrule or socket member which is rigidly secured to the stick, and an expansible sleeve or bushing which serves to couple the tip to said ferrule.

The accompanying drawings illustrate the invention, in which—

Figure 1 is a side view of the end of a billiard-cue with my invention applied. Fig. 2 is a similar view with the extremity of the cue shown in longitudinal section. Fig. 3 is a perspective view of the cue ferrule. Fig. 4 is a perspective view of the bushing member. Fig. 5 is a perspective view of the cue-tip.

The letter A represents the stick of a cue which is turned down at its end to provide a cylindrical stud $A^1$ which protrudes from an annular shoulder $A^2$. Seated upon said shoulder is a ferrule B which is bored to provide a socket $B^1$ for the stub $A^1$ and likewise therebeyond a tapering recess $B^2$ having its smaller diameter at the mouth.

The tip C is of rubber, leather or other suitable material, and is formed with a head $C^1$ and a shank $C^2$, said head being of a diameter equal to the ferrule at its outer end, and the shank is of a conoidal shape of approximately the dimensions of the ferrule recess $B^2$.

A clamping member D constructed of a spring metal plate is formed substantially as shown in Fig. 4 and approximately that of the peripheral surface of recess $B^2$ although of normally greater diameter than the latter.

The ferrule is cemented or otherwise rigidly secured to the stick A. To connect the tip to the stick, the member D is first placed about the tip shank $C^2$; the member is then pinched between the fingers to allow it to be introduced in ferrule recess $B^1$, and shoved down with the tip until the shoulder $C^3$ under the head of the latter, is juxtaposed with the outer end of the ferrule. When in this position, the resiliency of the member D will assert itself to bear against the peripheral surface of the recess, while the expanding of the shank will, in turn, cause it to engage said member and contribute to the pressure of the same against the interior of the ferrule.

To remove the tip, the stick is grasped in one hand of the operator and with the fingers of the other hand the tip is forcibly withdrawn, the shank meanwhile being compressed to allow its passage through the contracted mouth of the ferrule recess. Should the member D not accompany the tip, it may be subsequently removed by a knife blade or other suitable device.

The invention is extremely simple and one tip may be quickly substituted for another.

What I claim as my invention, is—

1. A billiard-cue, having a ferrule provided with a tapering recess having its smallest diameter at the outer end thereof, a tip formed of a compressible material and provided with a shank adapted to be inserted within said recess, and a conoidal shaped clamping member formed of a plate of resilient material and adapted when compressed to be introduced into the ferrule recess, said clamping member being interposed between the tip-shank and the ferrule and serving to detachably connect them together so that the tip may not be readily withdrawn through the contracted mouth of said recess.

2. A billiard-cue having a stick provided with a stub which terminates at a shoulder adjacent to the end of the stick, a ferrule provided with a socket to receive said stub and fixedly connected therewith, said ferrule being provided with a tapering recess beyond the extremity of said stub, a tip having a shoulder arranged to seat against the outer end of the ferrule and provided with a shank which extends into said recess, and a clamping member of less length than the distance between the stub-end and the outer end of the ferrule, said member being formed with a taper and adapted to be introduced with said shank into the ferrule recess and coöperate therewith to prevent the accidental withdrawal of the tip from the ferrule.

Signed at Seattle Wash., this 25th day of April, 1914.

WILLIAM RUTHERFORD.

Witnesses:
 PIERRE BARNES,
 HORACE BARNES.

Copies of this patent may be obtained for five cents each, by addressing the "Commissioner of Patents, Washington, D. C."